Nov. 11, 1941.  H. D. JAMES  2,262,586
LIGHTING SUSPENSION FIXTURE
Filed Nov. 8, 1938  6 Sheets-Sheet 1
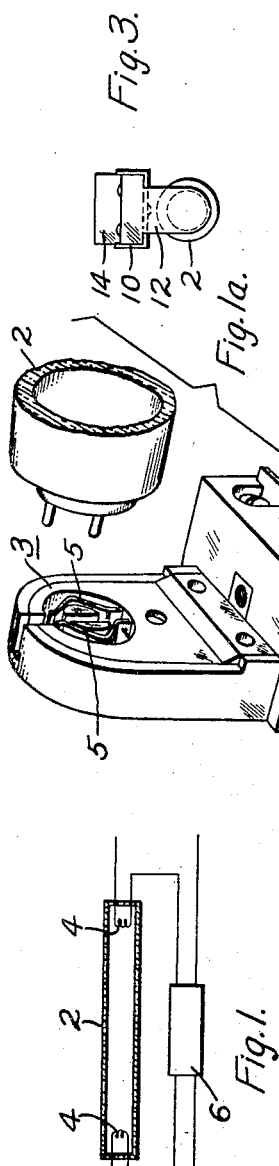
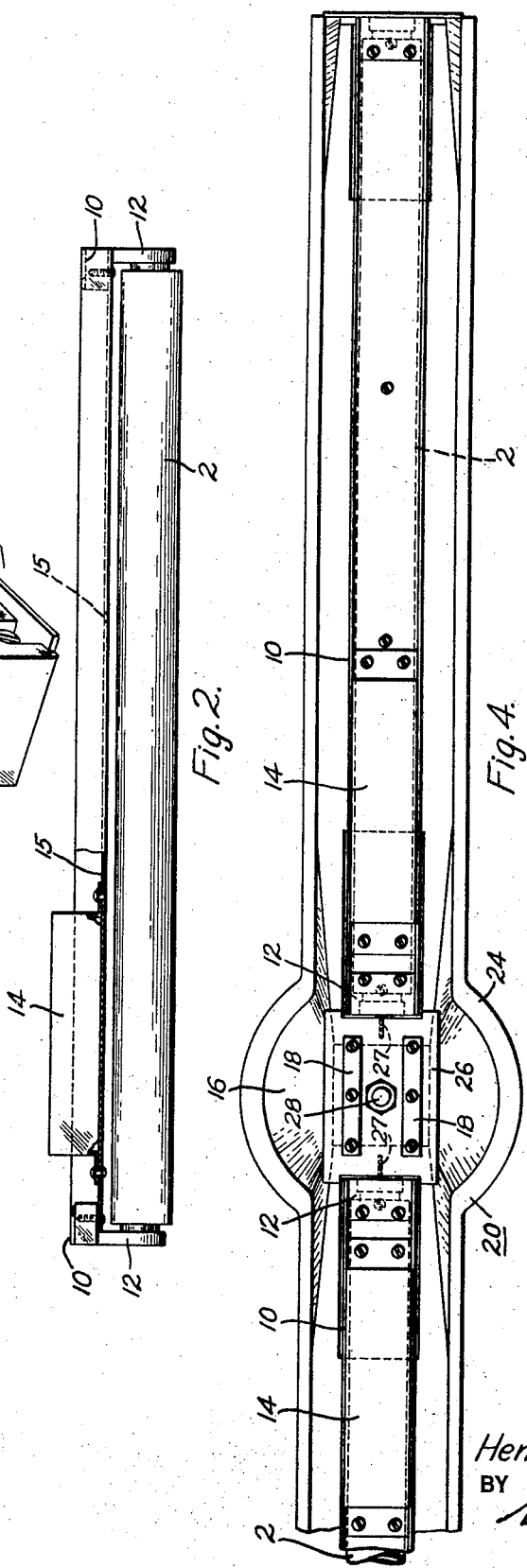
WITNESSES:
INVENTOR
Henry D. James.
BY
ATTORNEY Nov. 11, 1941.  H. D. JAMES  2,262,586
LIGHTING SUSPENSION FIXTURE
Filed Nov. 8, 1938  6 Sheets-Sheet 2
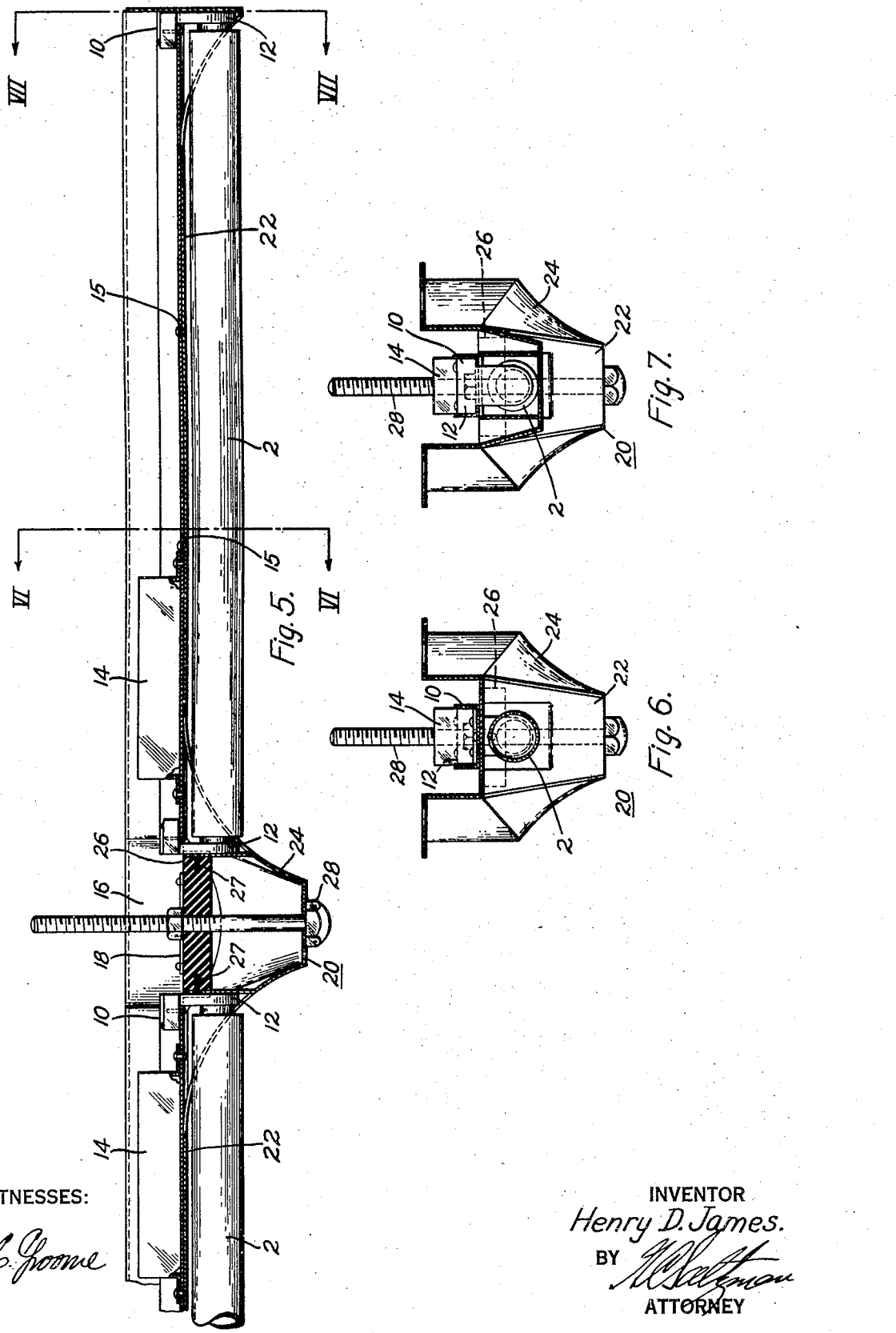
INVENTOR
Henry D. James.

Nov. 11, 1941.   H. D. JAMES   2,262,586
LIGHTING SUSPENSION FIXTURE
Filed Nov. 8, 1938   6 Sheets-Sheet 3
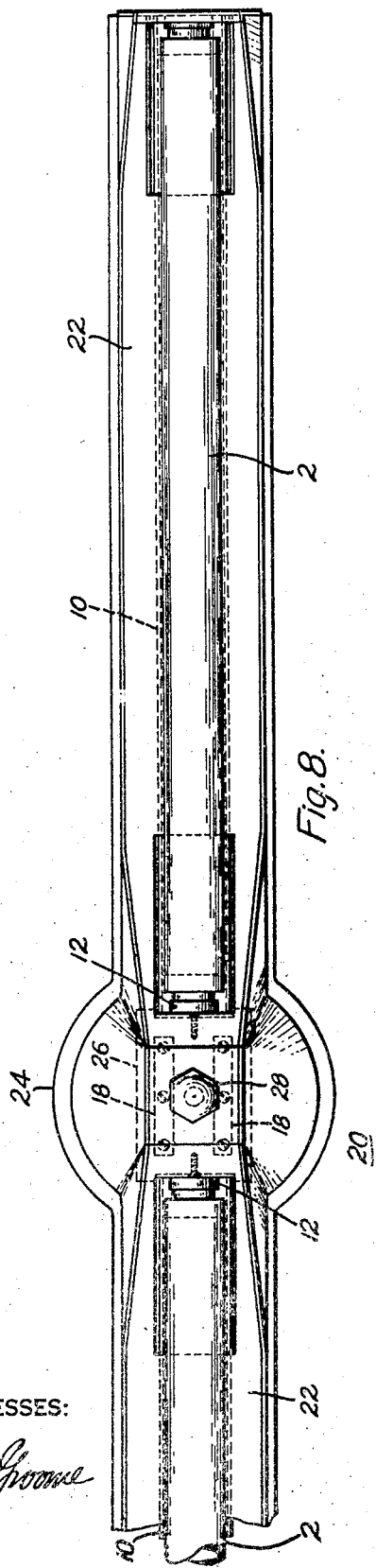
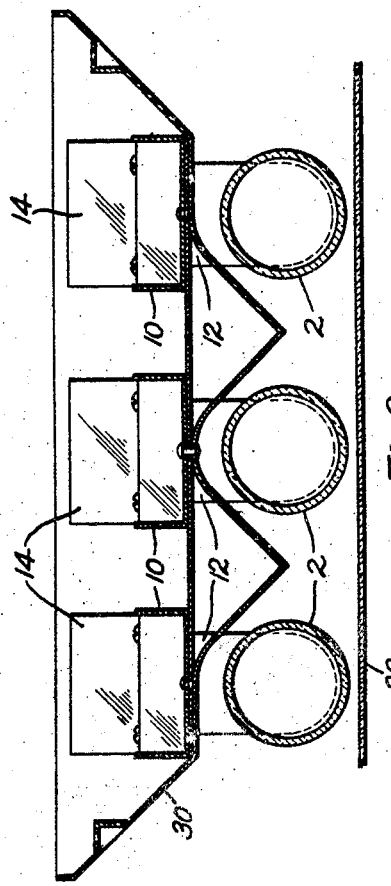
WITNESSES:
INVENTOR
Henry D. James.
BY
ATTORNEY Nov. 11, 1941.     H. D. JAMES     2,262,586
LIGHTING SUSPENSION FIXTURE
Filed Nov. 8, 1938     6 Sheets—Sheet 4

WITNESSES:

INVENTOR
Henry D. James.
BY
ATTORNEY

Nov. 11, 1941.   H. D. JAMES   2,262,586
LIGHTING SUSPENSION FIXTURE
Filed Nov. 8, 1938   6 Sheets—Sheet 5

WITNESSES:

INVENTOR
Henry D. James.
BY
ATTORNEY

Nov. 11, 1941.   H. D. JAMES   2,262,586
LIGHTING SUSPENSION FIXTURE
Filed Nov. 8, 1938   6 Sheets-Sheet 6
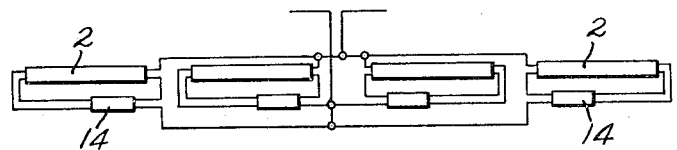
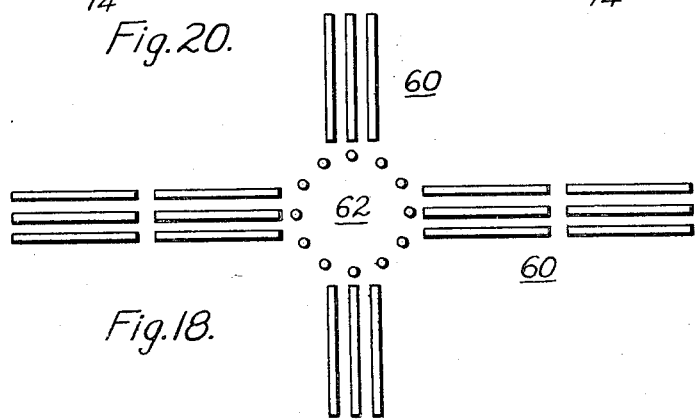
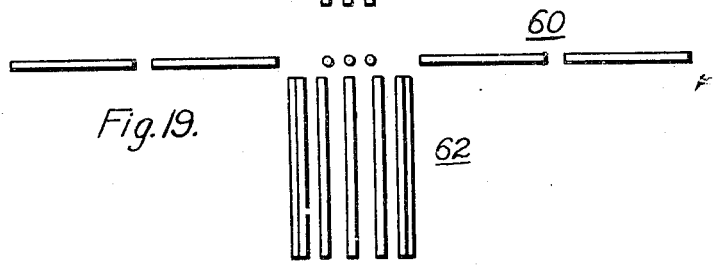
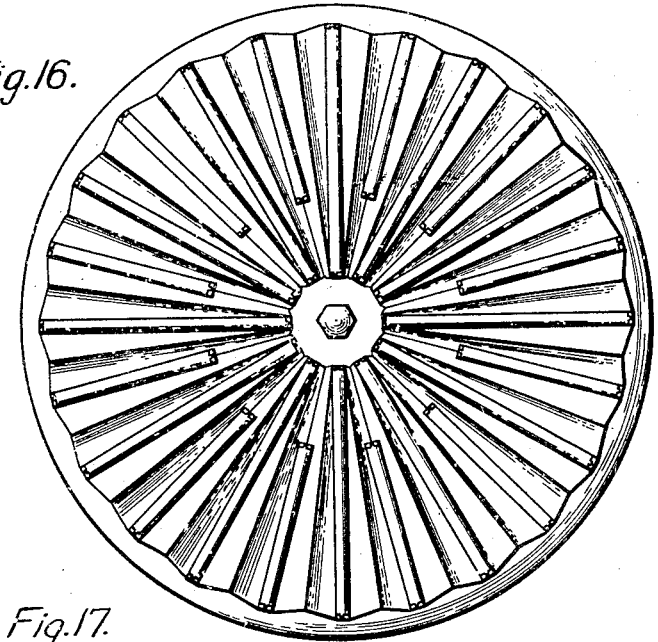
INVENTOR
Henry D. James.
BY
ATTORNEY Patented Nov. 11, 1941

2,262,586

UNITED STATES PATENT OFFICE 2,262,586

LIGHTING SUSPENSION FIXTURE

Henry D. James, Pittsburgh, Pa.

Application November 8, 1938, Serial No. 239,479

4 Claims. (Cl. 240—78)

The present invention relates to illumination fixtures with particular reference to a self-contained unit embodying the necessary terminal sockets and automatic control for an electric lamp of the fluorescent tube type.

A recent development in the illumination art is the fluorescent tube lamp which has a low surface intensity of illumination, but about double the illumination per watt produced by the usual incandescent bulb. However, such tubes are usually from eighteen to thirty-six inches long and from one to one and one-half inches in diameter, and coupled with the facts that they are provided with electrodes and terminals at each end, and require some sort of starting and control device, the design of a fixture for accommodating them with the required wiring and control has presented a novel problem.

Lamps of the character contemplated are radically new. The method by which light is produced is entirely different from that employed in the conventional tungsten filament or luminous vapor lamps. At each end of the lamp tube, a small electrode filament is located. In addition to the electrodes, the lamp also contains a small amount of mercury and some argon gas. The inner wall of the tube is coated with various chemical compounds depending upon the color of light that it is desired to generate. When the lamp is placed in operation, the two electrodes are connected in series by means of a special thermal time-delay switch which permits the electrodes to reach a cherry red temperature within a few seconds. The series connection of the two electrodes is then suddenly broken by the relay and the high voltage surge provided by the current control device establishes a discharge between the two electrodes.

The discharge in the fluorescent lamp is of the very low pressure type producing little visible light. It is, however, very rich in invisible ultra-violet radiations and it is the effect of these radiations on the chemical compounds that coat the inner wall of the lamp which generates the visible light. These chemical compounds, generally known as "phosphors," have the property of being activated to fluorescence by ultraviolet radiations of certain wave lengths. Like other lamps employing an electric discharge, commonly known as an arc, they must be operated in conjunction with current control equipment in order that the current and voltage be maintained at the proper values.

Because of the low intensity of illumination of lamps of this character, a considerable surface area is required to obtain a desired illumination level, and since they have a higher first cost than the usual incandescent filament lamp, the efficiency of a fixture for mounting them is important in that all of the useful light must be utilized so far as is practicable.

It is an object of the present invention to provide a unitary mounting, or fixture, for a light source of the fluorescent-tube type embodying as a unit the required terminal means and control equipment to facilitate the installation thereof and include means for insuring that the maximum illumination is directed or reflected in a useful direction.

A further object of the invention is to provide a unitary mounting or fixture embodying such light source provided with reflectors so arranged that the light from such source blends into the reflecting surface to provide a substantially continuous illuminating area to provide a maximum useful illumination.

Other objects of the invention will be apparent from the following description read in conjunction with the accompanying drawings in which:

Figure 1 is a schematic diagram of the installation of a lamp of the fluorescent type according to the prior art;

Fig. 1a is a composite view partly in section and with parts broken away of a lamp and socket therefor used in the system indicated in Fig. 5;

Fig. 2 is a view in elevation, partly in section, of a unitary fixture embodying the present invention;

Fig. 3 is a view in end elevation of the fixture shown in Fig. 2;

Fig. 4 is a top plan view, partially broken away, of a fixture for two of the units shown in Figs. 2 and 3;

Fig. 5 is a view in elevation, partially in section, of the fixture shown in Fig. 4;

Figs. 6 and 7 are views in lateral section on the lines VI—VI and VII—VII of Fig. 5;

Fig. 8 is a bottom plan view of the fixture shown in Fig. 4;

Fig. 9 is a view in lateral section of a modified form of fixture embodying the invention;

Figs. 16 and 17 are views of a further modified form of fixture;

Figs. 18 and 19 are schematic showings of a further modification of the invention; and Fig. 20 is a schematic wiring diagram which may be used in fixtures of the character here contemplated.

Figure 10:
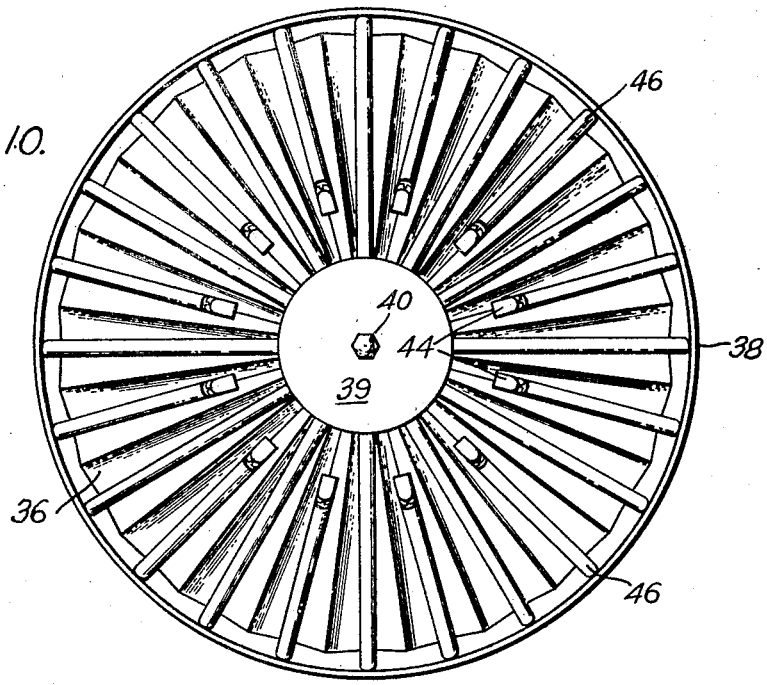
Figs. 10 and 11 are bottom and vertical section views of a further modified form of fixture.

Referring to Fig. 1, the fluorescent tube here contemplated comprises an elongated tubular member 2 having electrodes 4 at each end thereof. The two electrodes are connected in series by means of a relay until they reach the required temperature. A reactor or choke coil in the circuit is then effective, when the series connection is broken by the relay, which operates with a thermal time delay, to provide a surge to establish a discharge between the electrodes.

This circuit arrangement and control is more or less in accordance with the prior art. The tube and a socket therefor of a type which has been used are indicated in Fig. 1a, wherein the tube 2 is provided with contact prongs (the prongs at one end only being indicated) which are inserted through a slot in the top of the socket 3 and the tube then rotated ninety degrees to bring the two prongs into engagement, respectively, with two resilient contact strips 5. The strips 5 are connected within the socket to spaced terminals in the base thereof for connection to an external circuit.

In making the installation indicated in Fig. 1, it has been usual practice to fasten the tube 2 to the wall by screwing a separate terminal block 3 to a wall surface for each end of the tube and separately mounting the relay and reactor, designated as 6 in Fig. 1, in any convenient location which usually results in an unsightly installation.

To remedy this unsatisfactory practice, a unit as shown in Fig. 2, is proposed. Here a base 10, comprising a channel of sheet metal, carries with it at spaced points, terminal sockets 12 (corresponding to the socket 3 of Fig. 1a) for receiving the tube terminals. Within the space defined by the channel 10, a control box 14, containing the relay and choke coil is secured, along with the necessary wiring (not shown) for the terminal sockets and control box to constitute a unitary fixture which may be mounted as desired after cutting a depression or niche in a wall or ceiling to receive the box 14. The channel 10 may be provided with mounting holes for receiving screws or the like, such as holes 15.

This type of fixture is of obvious advantage in simplifying the installation of lamps of this character. It can be manufactured and handled as a unit to effect economies in installation as compared with present practice. In many cases, however, it is not sufficiently pleasing in appearance, and a fixture as shown in the subsequent figures of the drawings may be desired.

In Figs. 4 through 8 two tubes 2 are provided in end-to-end alignment having a common terminal chamber 16 for connection to the usual supply circuit through terminal strips 18. The connection from the terminal blocks or sockets 12 and the strips 18 is not shown in these figures, for the purpose of simplifying the disclosure, but may be made in accordance with Fig. 20 to be described hereinafter.

Referring to Figs. 5 to 7, the two unitary tube units as shown in Fig. 2, are mounted in a second channel 20 and suitably secured thereto as indicated. The outer surface 22 of the channel 20 is polished or otherwise treated to be light-reflecting and is disposed behind the tubes 2, with side walls flared and formed to the shape of the fixture desired.

The base of the channel 20, in this embodiment, curves to extend over the sockets 12 and is provided with cut-away portions adjacent to the sockets through which the ends of the tubes extend for insertion into the sockets. As indicated in Fig. 5, the reflecting surface, or channel 20, may be one continuous member extending behind both tubes and covering all the terminals of both tubes, with a widened central portion 24 formed to provide a neat cover for the terminal block 26, and to receive a mounting stud 28. The cut-away portions may be bent back at the center of the fixture and secured to the terminal block 26, as at 27, and the ends 9 be continued around the ends of the sockets to present a pleasing appearance.

By means of the construction described, an unusually efficient and attractive two-unit fixture results. In the case of the ordinary incandescent bulb of high surface intensity, shielding and indirect lighting features are necessary, and usual fixture treatments suited to such bulbs are therefore unsuited to fluorescent tubes where the surface intensity is low and the direct reflection of all available light is desirable for economic reasons.

Quite apparently the basic fixture unit of Figs. 2 and 3 may be used to provide a variety of effects. For example, the fixture of Fig. 4 can be expanded to take care of a plurality of radially extending tubes in various patterns as described hereinafter.

Another modification is shown in Fig. 9 in which three of the basic units are disposed in parallel having the heads of tube sockets 12 extending through a base plate 30 which desirably is provided with a reflecting surface. Preferably the surface of the plate 30 constitutes a continuous surface behind the tubes 2 from the wall or ceiling surface up between adjacent tubes to usefully direct as much light as possible into the room. Although not usually necessary, a glass screen 32 of desired color or opacity may be supported in any desired manner in front of the tubes 2 to filter or diffuse the illumination.

Figure 11:
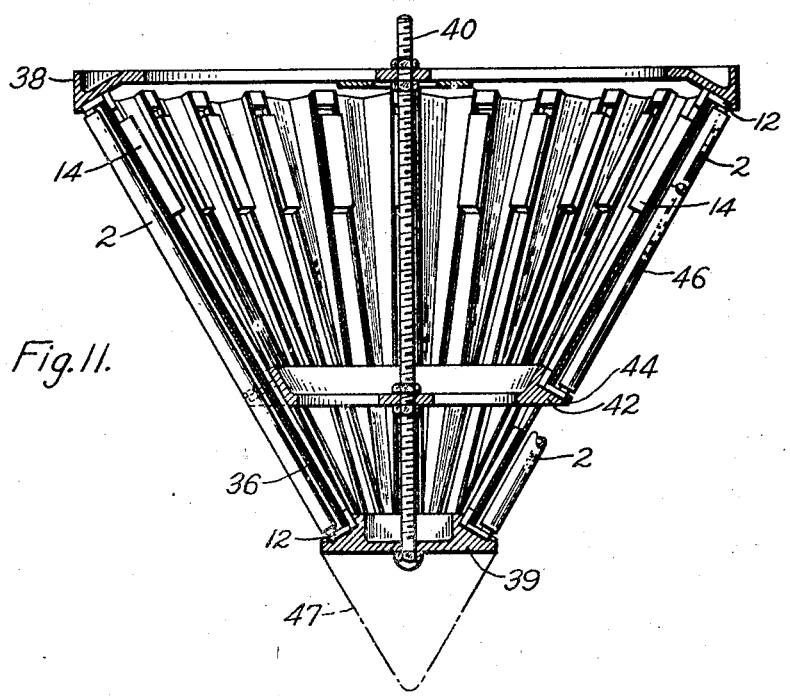
Figure 12:
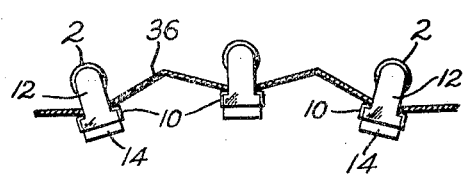
Fig. 12 is a detail in section of a portion of the fixture of Figs. 10 and 11.

A further modification is shown in Figs. 10 through 12 adapting the basic unit of Fig. 2 to a conical pendant fixture. Here a hollow reflector 36 of frusto-conical form is clamped between upper and lower end plates 38 and 39 by means of a tie-bolt 40. The upper and lower edges of the reflector 36 are notched at spaced points to receive the sockets 12 in such manner (as indicated in Fig. 12) that only the part of the socket that receives a tube terminal is exposed to the outer surface of the reflector, with the channel 10, control box 14 and socket bases disposed within the reflector. The upper and lower end plates 38 and 39 are recessed peripherally to seat the sockets, as shown more clearly in Fig. 11; the edge of the plate at one end of the fixture, such as the bottom plate 39, being provided with narrow slots communicating with the slot in the top of the socket for receiving the tube terminals to permit insertion and removal of the tubes.

An intermediate plate or spider 42 is also carried by the tie-rod 40 and is provided with portions 44 extending through apertures in the reflector 36 to support tube sockets of shorter tubes 46.

Such projecting portions are also recessed and slotted as in the case of the lower plate 39.

Referring again to Fig. 12, it will be noted that the surface of the reflector is corrugated to decrease the transfer of light between tubes and direct the light in a useful direction. This blends the direct and reflected light and increases the efficiency of the fixture. A decorative end cone 47 may be secured in the position indicated in dotted lines in any desired manner.

Figure 13:
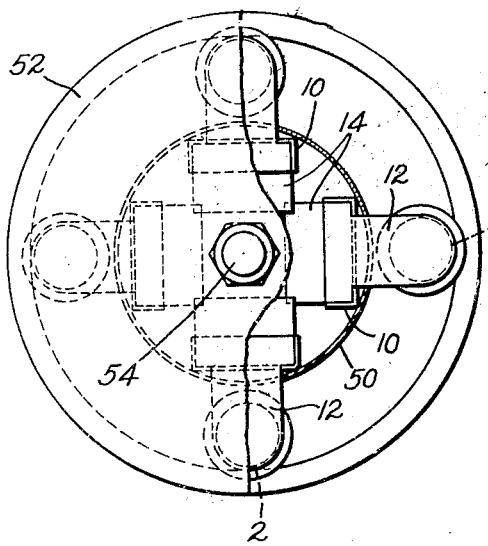
Fig. 13 is a top plan view, partly in section, of another form of fixture.
Figure 14:
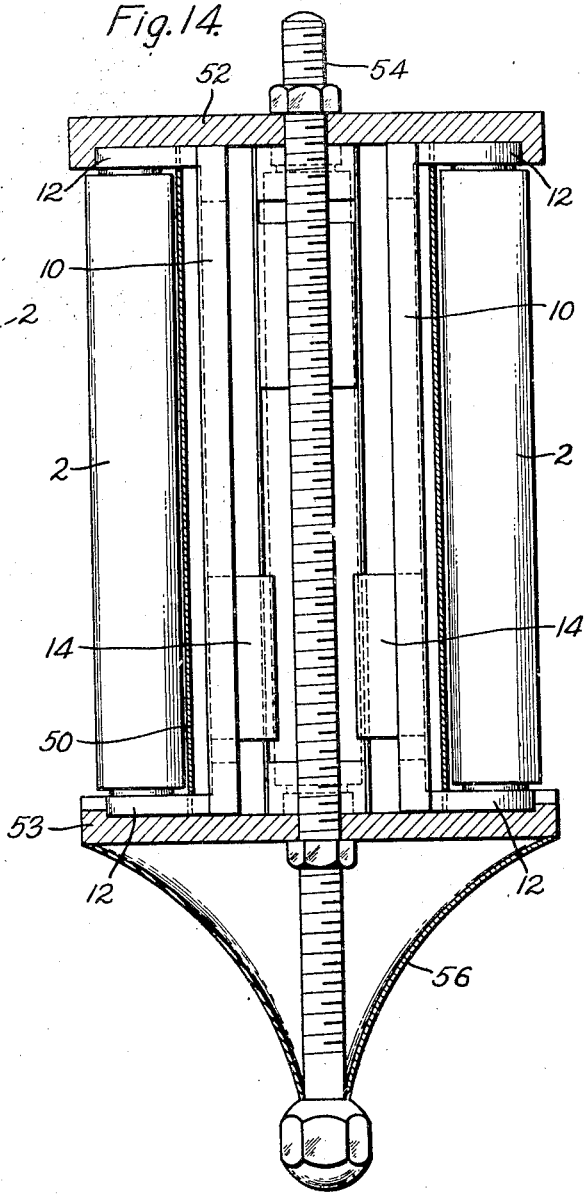
Fig. 14 is an elevational view, partly in section, of the form shown in Fig. 14.
Figure 15:
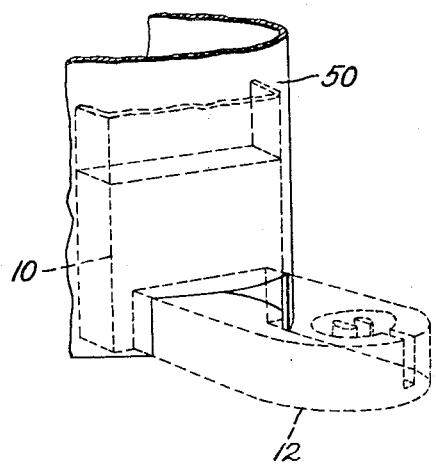
Fig. 15 is a detail view in perspective, at an enlarged scale, of a portion of Fig. 14.

Another form of the invention is shown in Figs. 13 through 15. Here a cylindrical reflector 50 is clamped between end plates 52 and 53 by means of a tie bolt 54, and is notched at its upper and lower edges to expose the tube receiving socket portions outside the reflector. Similarly to Figs. 10 through 12, the tubes 2 will then be exposed outside the reflector 50 with the sockets 12 disposed in recesses in the end plates 52 and 53. A decorative cap 56 may then be secured in position over the lower plate 53, as indicated.

Referring to Fig. 13, it will be noted the basic units including the channels 10 and control boxes 14 are so designed that they lend themselves to compact mounting in a reflector of relatively small diameter. This is the result of having each box 14 mounted toward one end of its respective channel so that the positions of the boxes may be staggered with respect to each other when grouped. That is, in Fig. 13 for example, the boxes on the horizontally opposite units are disposed in the lower part of the reflecting cylinder and the boxes for the vertically opposite units are disposed in the upper part thereof.

Figs. 16 and 17 show a type fixture adapted to cover a relatively large ceiling area. It is essentially the same as the conical unit of Figs. 10 through 12, but flattened, and it is believed that a detailed explanation of the construction thereof is unnecessary.

Figs. 18 and 19 diagrammatically illustrate a fixture embodying radially extending sets of tubes 60, and a depending set 62. The radially extending sets may be mounted in much the same manner as in Fig. 4, and the depending set may be arranged in cylindrical formation similarly to Figs. 13 and 14.

The wiring for the various forms of fixture shown herein has been omitted in the interest of avoiding complications in the illustrations. From Fig. 1, however, it is believed clear how one basic unit may be wired, and in fixtures having a plurality of such units it is contemplated that they shall be connected in parallel circuit relation as indicated in Fig. 20.

Quite obviously other modifications of the invention will present themselves, and it is intended that the invention shall be limited only by the scope of the appended claims.

I claim as my invention:

1. In a lighting fixture, a plurality of lighting units each comprising an elongated base member having a socket at each end thereof spaced to receive the terminals of a lamp of the fluorescent-tube type and having a control device secured to the opposite side of said base member to one side of the lateral center line thereof, means for supporting said plurality of units in substantially parallel relation comprising a supporting base plate having a central rod extending therefrom, and means for mounting said units symmetrically around said rod and parallel therewith including a top plate adjustably mounted on said rod for clamping said units against said base plate, said units being so disposed that the sockets thereof extend outwardly away from said rod with said control devices being disposed adjacent to said rod.

2. In a lighting fixture, a plurality of lighting units each comprising an elongated base member having a socket at each end thereof spaced to receive the terminals of a lamp of the fluorescent-tube type and having a control device secured to the opposite side of said base member to one side of the lateral center line thereof, means for supporting said plurality of units in substantially parallel relation comprising a supporting base plate having a central rod extending therefrom, and means for mounting said units symmetrically around said rod and parallel therewith including a top plate adjustably mounted on said rod for clamping said units against said base plate, said units being so disposed that the sockets thereof extend outwardly away from said rod with said control devices being disposed adjacent to said rod and alternate ones of said units being reversed end-to-end.

3. In a lighting fixture, a plurality of lighting units each comprising an elongated base member having a socket at each end thereof spaced to receive the terminals of a lamp of the fluorescent-tube type and having a control device secured to the opposite side of said base member to one side of the lateral center line thereof, means for supporting said plurality of units in substantially parallel relation comprising substantially circular top and bottom plates, a rod extending axially through said plates and means for adjustably securing said plates thereto, said units being disposed around said rod to extend parallel to it and clamped in such position by said plates with the sockets of said units projecting adjacent to the surface of the cylinder defined by said plate and the control devices being disposed adjacent to said rod.

4. In a lighting fixture, a plurality of lighting units each comprising an elongated base member having a socket at each end thereof spaced to receive the terminals of a lamp of the fluorescent-tube type and having a control device secured to the opposite side of said base member to one side of the lateral center line thereof, means for supporting said plurality of units in substantially parallel relation comprising substantially circular top and bottom plates, a rod extending axially through said plates and means for adjustably securing said plates thereto, said units being disposed around said rod to extend parallel to it and clamped in such position by said plates with the sockets of said units projecting adjacent to the surface of the cylinder defined by said plate and the control devices being disposed adjacent to said rod, and means comprising a reflecting surface enclosing said units and having portions removed for said sockets to project therethrough and clamped in position with said units between said top and bottom plates.

HENRY D. JAMES.